United States Patent [19]

Sidles, Jr. et al.

[11] 4,142,615
[45] Mar. 6, 1979

[54] WHEEL DRIVE ASSEMBLY

[75] Inventors: Peter Sidles, Jr., Oswego; Aleksander Mankowski, Downers Grove, both of Ill.

[73] Assignee: Caterpillar Tractor Co., Peoria, Ill.

[21] Appl. No.: 657,983

[22] Filed: Feb. 13, 1976

[51] Int. Cl.² .................. F16H 57/10; B60K 17/04; B60K 41/26

[52] U.S. Cl. .................. 192/4 A; 180/43 B; 74/391

[58] Field of Search .................. 74/781 R, 391, 411.5; 180/43 B; 192/113 B, 4 A

[56] References Cited

U.S. PATENT DOCUMENTS

| | | | |
|---|---|---|---|
| 2,953,040 | 9/1960 | Christenson et al. | 74/781 R |
| 3,382,736 | 5/1968 | Abbott | 74/781 R X |
| 3,439,766 | 4/1969 | Dence et al. | 180/43 B |
| 3,754,625 | 8/1973 | Voth et al. | 74/391 X |
| 3,762,503 | 10/1973 | Wilder et al. | 192/113 B X |
| 3,913,616 | 10/1975 | Horsch | 192/113 B X |
| 3,954,026 | 5/1976 | Rittmann et al. | 180/43 B X |
| 4,037,694 | 7/1977 | Keese | 192/4 A |

Primary Examiner—Samuel Scott
Assistant Examiner—Lance W. Chandlee
Attorney, Agent, or Firm—Wegner, Stellman, McCord, Wiles & Wood

[57] ABSTRACT

A wheel driven by a planetary reduction gear train has a disc brake pack acting between a fixed member and a rotating member for stopping or slowing the rotation of the wheel. The disc brake pack is mounted between the fixed and rotatable members before the planetary reduction gear set is assembled on the shaft making it possible to service the disc brake pack without removing the wheel from the shaft. In one embodiment, the sun and planet gears act as a pump for circulating cooling fluid to the disc brake pack.

14 Claims, 3 Drawing Figures

WHEEL DRIVE ASSEMBLY

BACKGROUND OF THE INVENTION

1. Field of the Invention

This invention relates to land vehicles and, more particularly, to an improved mounting and servicing arrangement for a brake for a planetary reduction gear driven wheel for said vehicles.

2. Description of the Prior Art

In land vehicles and, in particular, vehicles such as wheel loaders, and the like, planetary gear reduction systems have been mounted on the axle and between the axle and the wheel whereupon the speed reduction and torque increase of a planetary reduction gear system is used in advantage for driving the wheel. In some prior art devices, separate means are mounted on a non-rotatable axis for driving one element of the planetary gear reduction system for providing the motive power to the wheel. Such a device is shown in U.S. Pat. No. 3,812,928 entitled "Electric Powered Wheel" in the names of Harvey W. Rockwell and William L. Ringland. Various arrangements have been provided in the prior systems for applying a braking force to the wheel so as to arrest rotation of the wheel. In most prior art devices, it is necessary to remove the wheel in order to gain access to the brake arrangement for providing service to the brake. Also, in many prior art devices the brakes are located in such a way that it requires special hydraulic lines to provide cooling fluid for the brakes, or where the lubricant is slopping freely within the planetary reduction gear and brake housing, there has been inadequate cooling of the brakes due to inadequate amounts of cooling fluid at certain critical points. These prior devices required hydraulic pumps and conveying means for directing the hydraulic fluid from the pump to the brake for cooling purposes.

An additional problem with the prior art devices has to do with the location of the brakes or the types of brakes used, which required high torque capacity in order to provide the braking required.

SUMMARY OF THE INVENTION

An improved arrangement for driving a wheel by means of a planetary reduction gear arrangement between a rotatable axle and the wheel is provided. The sun gear is driven by the axle with the ring gear fixed to the housing and the planetary gear carrier being driven by the sun gear and being connected to the wheel to rotate the wheel. A disc brake pack is mounted between the rotatable axle and the fixed housing, which brake pack is activated by hydraulic controls. The disc brake pack is located in such a way that it is readily accessible for servicing by simply removing the planetary gear carrier, with planet gears, from the wheel.

To cool the brake pack, the teeth of the planetary wheels and the teeth of the sun gear mate in such a way as to pump hydraulic fluid into the brake pack for cooling the brake pack. In another embodiment of the invention, the brake pack is located in such a way that the rotation of the planetary gear carrier serves to splash cooling fluid on the disc brakes so as to cool the disc brakes.

The disc brake packs are located between the fixed housing and the rotatable axle in such a way as to provide lower torque capacity to affect the braking action between the rotatable wheel and the housing.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
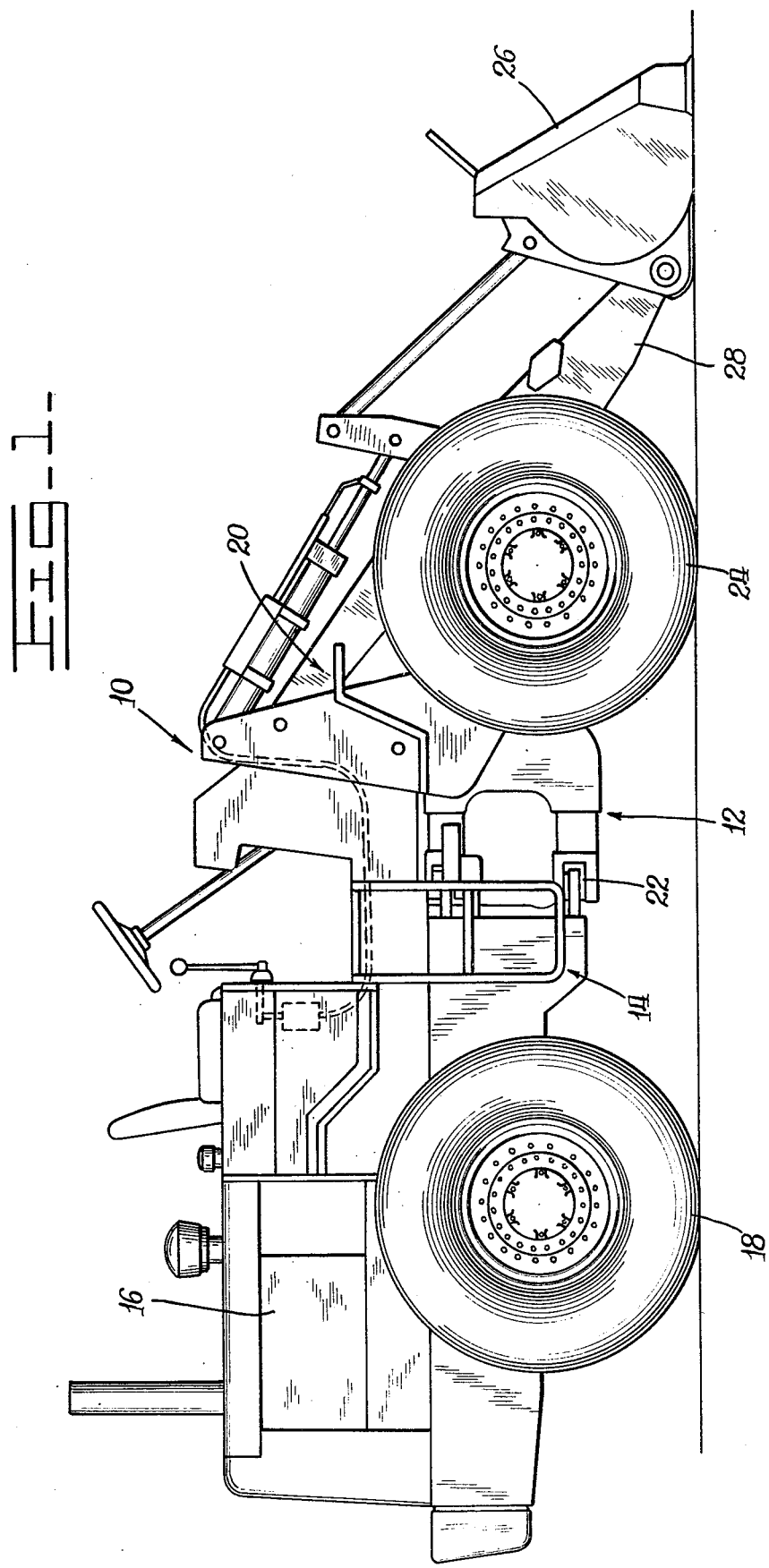
FIG. 1 is an elevational view of a wheel loader vehicle incorporating our invention in at least one pair of wheels thereon.

In the drawings, FIG 1 illustrates a wheel loader 10 having an articulated frame 12, the rear portion 14 of which supports an engine 16 for driving an axle to the rear wheels 18. The front portion 20 of the frame 12 is pivoted at 22 to the rear portion 14 of the frame and supports the front wheels 24 and a general purpose bucket 26 on the end of the lift arms 28.

Figure 2:
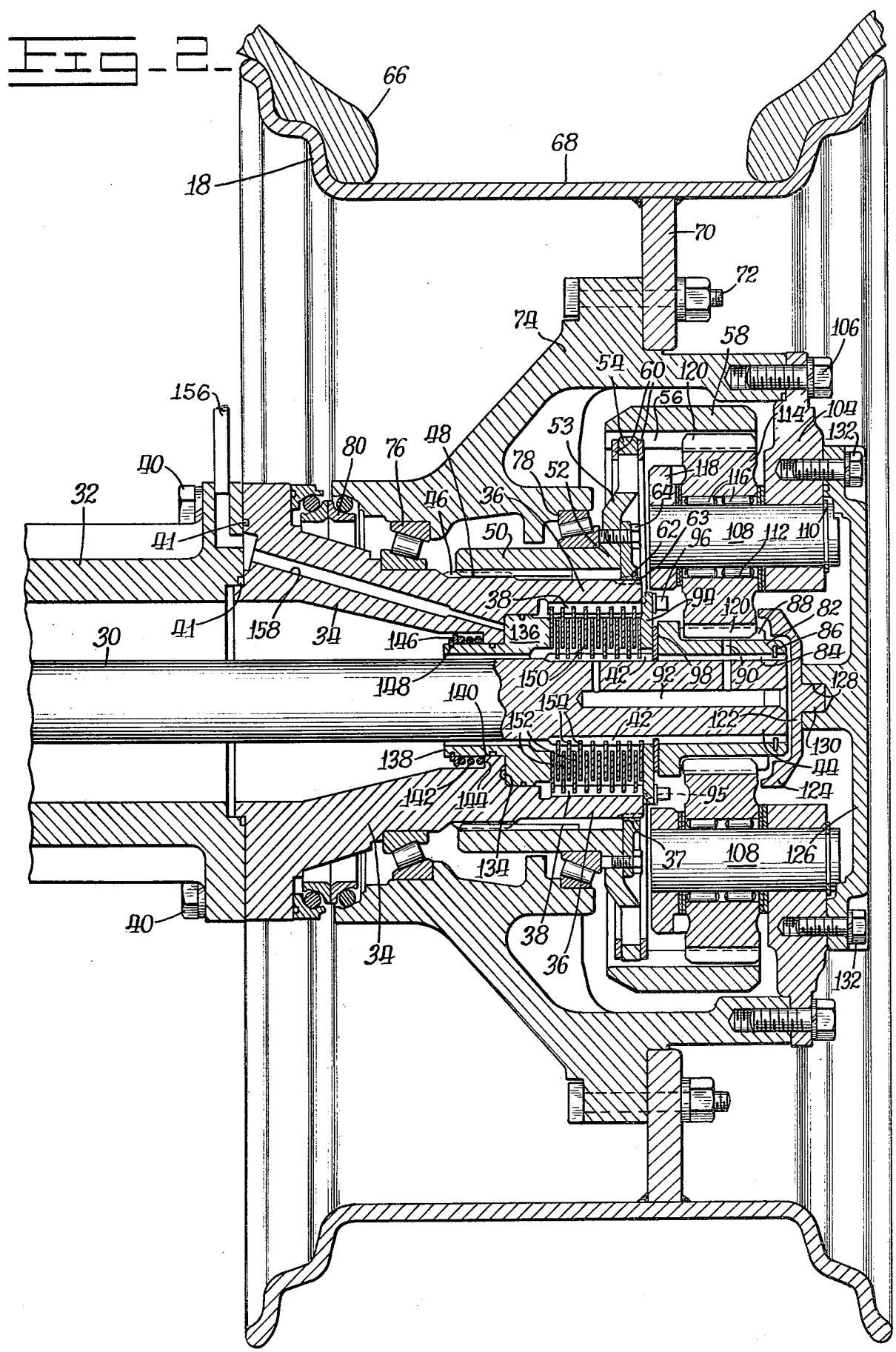
FIG. 2 is an enlarged, section view through the axle and hub of one of the wheels of FIG. 1, showing one embodiment of our improved planetary reduction gear arrangement and brake disc pack; and, FIG. 3 is another embodiment of our invention with a sectional view, similar to the sectional view of FIG. 2, only showing the modified structure of the brake disc pack.

Referring, in particular, to the embodiment shown in FIG. 2, an axle or shaft 30 is rotatably driven by the engine 16 and projects outwardly from the housing 32 carried by the frame 12. Although only one wheel 18 and one end of the shaft 30 is shown and described, it is to be understood that the same structure is installed and is operative on the other rear wheel 18 and on the other end of the shaft 30. In some vehicles, all wheels may be driven by arrangements that are comparable to the arrangements described hereinafter. Bolted to the housing 32 is the sleeve or spindle 34 which is concentrically disposed with respect to the axle or shaft 30 and has an axially disposed end portion 36 which has an internal spline 38 formed around the inner surface thereof. The spindle 34 is secured to the housing 32 by means of bolts or studs 40 and has seals 41 therebetween. The axle or shaft 30 has a spline 42 formed in the outer end portion 44 thereof with part of the spline extending within the confines of the end portion 37 of the spindle 34.

The outer surface of the outer end portion 36 of the spindle 34 has an external spline 46 which mates with a spline 48 formed internally of the cylindrical portion 50 of the ring gear hub 52. Said ring gear hub 52 has a radially extending flange 52 which has teeth 54 formed in the outer circumferential surface thereof. The teeth 54 of the hub engage with the internal spline 56 formed on the inner surface of the ring gear 58. The ring gear hub 52 is held in position with respect to the ring gear 58 by means of the split rings 60 secured on opposite sides of the ring gear hub 52 and seated in slots in the internal gear teeth 56 of the ring gear 58. The ring gear 58 and ring gear hub 52 are secured on the outer end portion 36 of the spindle 34 by means of the positioning ring 62 which is bolted to the hub 52 by bolts 64. The positioning ring 62 has a threaded internal portion 63 which engages the end portion 36 of the spindle 34 through threaded external portion 37.

The rear wheel 18 has a tire 66 mounted on the wheel rim 68 which has an internal flange 70 bolted by means of bolts 72 to the wheel hub 74. The wheel hub 74 is rotatably mounted on the spindle 34 by means of the bearings 76,78. One bearing 76 is seated between the spindle 34 and the rear portion of the wheel hub 74. The bearing 78 is carried by the cylindrical portion 50 of the ring gear hub 52 and engages the outermost portion of the wheel hub 74. To maintain a fluid seal between the non-rotatable spindle 34 and the rotatable wheel hub 74, a duo cone seal 80 is positioned therebetween. In this way, the rear wheel 18 is rotatable relative to the spindle 34 and housing 32 and the seal 80 maintains lubricant or fluid in a chamber formed by the wheel hub 74, planetary carrier 104, cap 126 and spindle 34.

Part of the end portion 44 of the axle or shaft 30 extends beyond the outer end of the end portion 36 of the spindle 34 and has a sun gear 82 with an internal spline 84 engaging with the spline 42 on said axle or shaft 30. A snap ring 86 is seated in an opening in the internal surface of the sun gear 82 so as to secure the sun gear 82 against axial movement relative to the axle or shaft 30. The sun gear 82 has external gear teeth 88 and has radial passageways 90 communicating between the roots of the gear teeth 88 and passageways 92 in the shaft 30. The passageways 92 communicate into, through and out the end portion of the spline 42 encircled by the portion 36 of the spindle 34 for a purpose to be described hereinafter. A reaction plate or ring 94 is bolted by bolts 96 to the end surface of the spindle 34 and has a bearing washer 98 seated between the one end of the sun gear 82 and the outer face of said reaction plate or ring 94.

A planetary carrier 104 is bolted by bolts 106 to the axially facing end of the wheel hub 74. The planetary carrier 104 has three parallel axially directed pins or pivots 108 secured by split rings 110 in equally spaced apart apertures 112 therethrough. Planet gears 114 are rotatably mounted on bearings 116 on the pins or pivots 108 by means of retaining members 118. The teeth 120 on the planet gears 114 engage with the internal gear teeth 56 in the ring gear 58. A cap member 122 is positioned around the end of the shaft 30 and has collar portions 124 closely fitting around the ends of the gear teeth 88 in the sun gear 82 and the teeth 120 on the planet gears 114. A hub cap or cover 126 is bolted over the cap 122 with the wall of a positioning aperture 128 engaging with the stub 130 of the cap 122. The hub cap 126 is bolted to the outer surface of the planetary carrier 104 by means of a plurality of bolts 132.

An enlarged cavity or chamber 134 is provided on the inside of the end portion 36 of the spindle 34. A piston 136 is slidably disposed in the chamber 134 and has an axially extending reduced diameter sleeve portion 138 extending through an opening 140 in the spindle 34. A compression spring 142 encircles the reduced diameter sleeve 138 and bears against a shoulder 144 on the spindle 34. A washer 146 is seated between the end of the spring 142 and a snap ring 148, which is nested in a slot in the outer surface of the sleeve 138. The snap ring 148 and washer 146 will retain the spring 142 in compression against the shoulder 144 on the spindle 34 so as to urge the piston 136 against the end wall of the chamber 134.

A disc brake pack 150 is positioned between the piston 136 and the reaction plate or ring 94. The disc brake pack 150 includes alternate discs or rings 152 which have slots formed in the outer surface thereof which slots receive the splines 38 in the spindle 34. Between each pair of discs or rings 152 is a disc or ring 154 which has internal slots formed on the inner diameter thereof, which slots receive the splines 42 formed on the outer surface of the shaft 30. With the piston 136 positioned against the end wall of the chamber 134, the discs 152 and 154 will be spaced from each other so as to permit free rotation of the discs 154 with the shaft 30 relative to the non-rotating discs 152 on the spindle 34. The splines 38,42 in the slots in the discs 152,154 will permit the discs to position themselves out of contact with each other when the piston 136 is in the left-hand position of FIG. 2. When hydraulic fluid is forced through the tube 156 and bore 158 in the spindle 34, it will bear against the piston 136 in the chamber 134 to drive the piston 136 to the right and compress the spring 142. The rotating discs 154 will engage with non-rotating discs 152 thereby stopping rotation of the disc 154 and shaft 30.

With the shaft 30 rotating, the sun gear 82 rotates and drives the planet gears 114 and planetary carrier 104 relative to the fixed ring gear 58. The planetary carrier 104 being connected to the wheel hub 74 will rotate the wheel relative to the housing 32 at a speed lower than the speed of the shaft 30, but with increased torque. When it is desired to stop the rotation of the wheel, hydraulic fluid is forced into chamber 134 for driving the piston 136 to actuate the disc brake pack 150 whereby the rotation of the shaft 30 will be arrested.

To cool the gears and the brake discs, hydraulic fluid, up to a certain level, is maintained in the open cavity around the planetary reduction gear train and brake. To insure that an adequate amount of cooling fluid flows through the disc brake pack 150, the teeth 120 of the planet gears 114 closely mesh with the gear teeth 88 of the sun gear 82 to pump hydraulic fluid floating around the sun gear 82 through the passageways 90 and 92 and into the open area in which the brake discs 152,154 are located. The cooling fluid will serve to cool the brake discs 152,154. The collars 124 on cap 122 will fit close to the end of the sun gear 82 and around the ends of the gear teeth 88 and the teeth 120 so that the interfit between the teeth 120 and gear teeth 88 will pump the cooling fluid through passageways 90,92 into the open area around the disc brake pack 150. A sealing bearing is positioned between the sleeve 138 of the piston 136 and the outer surface of the shaft 30 to prevent the fluid in the open area surrounding the discs 152,154 from escaping along the shaft 30. Slots 95 are formed in the inner surface of the reaction plate 94 to permit fluid communication between the roots of the spline 38 and the chamber containing the fluid that surrounds the planetary gear train. The cooling fluid in the open area of the brake pack is forced by centrifugal force outwardly from the brake discs into the roots of the spline 38 where it flows through the slots 95 back into the chamber around the planetary gear train. Rotation of the planetary carrier 104 and planet gears 114 around the sun gear 82 will serve to splash or slop the lubricating and cooling fluid around the moving parts so as to properly lubricate and cool the planetary reduction gear train.

Figure 3:
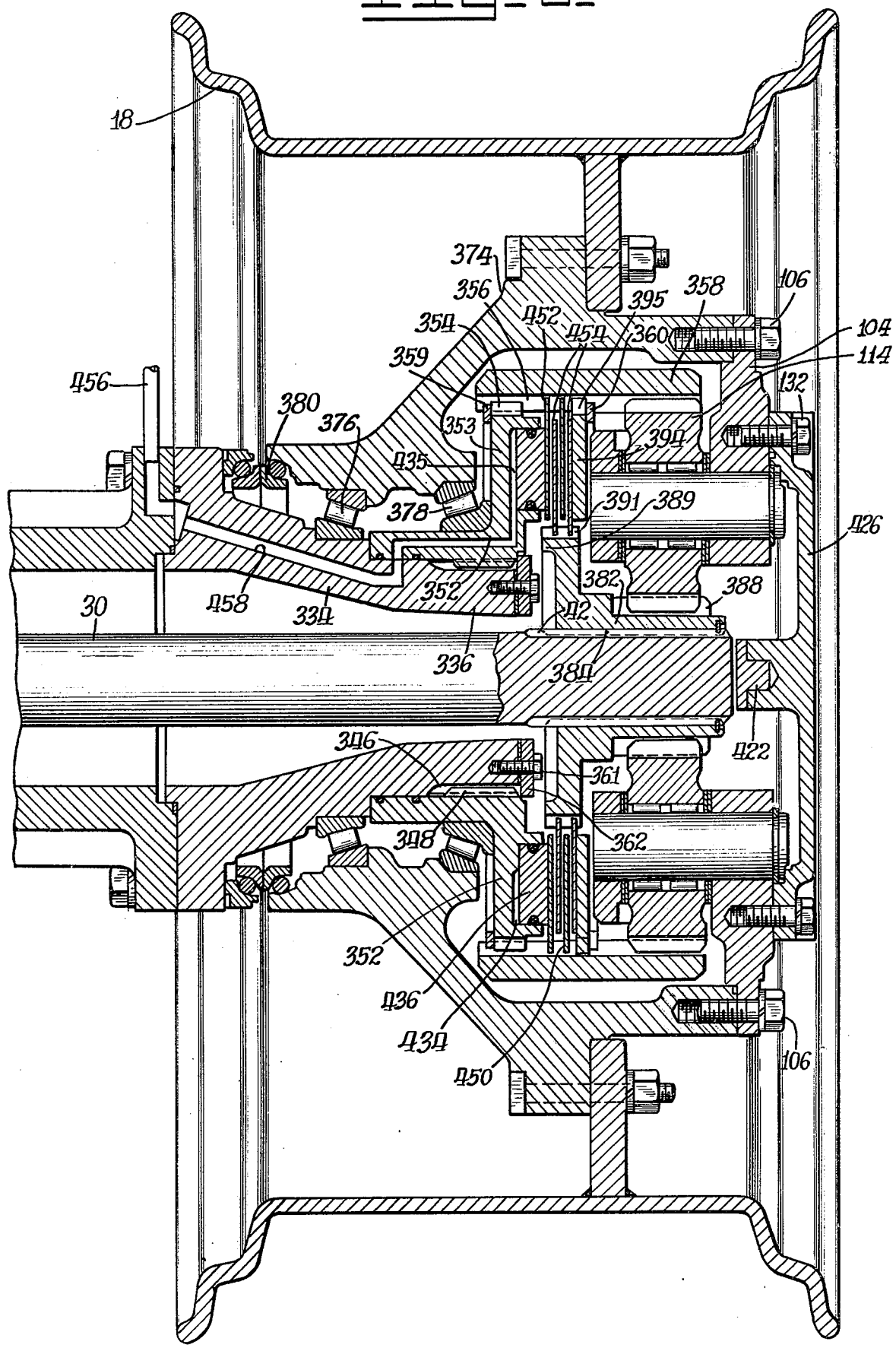

In the embodiment shown in FIG. 3, may of the parts or elements are the same as with respect to FIG. 2 and the reference numerals with respect to said parts or elements in FIG. 2 will be carried over to the present embodiment. The rotating drive shaft 30 has the spline 42 formed in the outer surface thereon to which, by means of an internal spline 384, is keyed a flanged sun gear 382. That is, flanged sun gear 382 has, on one end portion, the sun gear with the external gear teeth 388 and has an enlarged diametered other end portion 389 which has splines 391 formed in the outer circumference thereof. A plurality of brake discs 454 encircle the enlarged diameter portion 389 of the sun gear 382 and have slots formed in the inner diameter of the discs 454 which slots are adapted to receive the splines 391 on the enlarged portion 389 so that the discs 454 rotate with the sun gear 382 and may move axially with respect to said sun gear 382.

The spindle 334 has a spline 346 on the external surface of the outer end portion 336. A ring gear hub 352 has an internal spline 348 engaged with spline 346 in spindle 334 to prevent relative rotation between the gear hub and spindle. The gear hub 352 has a radial flange 353 with external teeth 354 engaged with the teeth 356 in the ring gear 358. The ring gear hub 352 is secured to the spindle 334 against axial movement by means of bolts 361 securing a retainer 362 in overlapping relation between said spindle 334 and said hub 352. The ring gear hub 352 is positioned with respect to the ring gear 358 by means of the snap ring 359 engaging in slots in the edges of the teeth 356 of the ring gear 358. The wheel hub 374 is rotatably mounted relative to the ring gear hub 352 and the spindle 334 by means of the bearings 376 and 378, and is sealed by a seal assembly 380. A ring-type reaction plate 394 has a spline 395 engaging with the teeth 356 in the ring gear 358 and is held in position relative to the ring gear hub 352 by means of the second snap ring 360 engaging in slots in the teeth 356 of the ring gear 358. A pressure ring or piston 436 is sealingly positioned in a chamber 434 formed in the ring gear hub 352 and has a pressurizing portion 435 between the rear surface of the piston 436 and the wall of the chamber 434. Passageways 458 communicate through the ring gear hub 352 and the spindle 334 to the external hydraulic lines 456.

Non-rotating brake discs 452 are interleafed between the rotating brake discs 454 and have slots formed in the outer circumference thereof in which slots the teeth 356 of the ring gear 358 slide so that the brake discs 452 may slide axially with respect to the ring gear 358 but will be held against rotation with respect to said ring gear 358. With the drive shaft 30 rotating, the sun gear 382 will rotate the planet gears 114 and planetary carrier 104 against the fixed ring gear 358 thereby rotating the wheel 18 at a reduced speed, but at increased torque. The sun gear 382 has splines 391 on the integrally formed enlarged end portion 389 engaging with and driving the rotating brake discs 454 in the brake pack 450. To stop rotation of the wheel 18, fluid under pressure is forced through the passageways 458 in the spindle 334 and ring gear hub 352 to drive the piston 436 to the right to lock the non-rotating brake discs 452 against the rotating brake discs 454 thereby stopping rotation of the brake discs 454 and of the sun gear 382 and drive shaft 30. The chamber in which the planetary gears 114 and planetary carrier 104 rotate has a certain level of hydraulic fluid maintained therein, which fluid is splashed and agitated by the rotation of the planetary carrier 104. The splash and agitation of the fluid will move the fluid past the brake discs 452,454 sufficient to cool the brake discs thereby obviating the need for pumping additional cooling fluid over the brake discs. A cap 422 is positioned between the end of the shaft 30 and the inside of the hub cap 426. The agitation and splash of the fluid in the chamber by the planetary carrier 104 will also lubricate and cool the moving parts of the planetary gear train.

For repair, replacement or service to the disc brake pack 150,450 of either the FIG. 2 or FIG. 3 embodiment, it is only necessary to remove the bolts 106 that retain the planetary carrier 104 against the wheel hub 74 or 374, which makes it possible to remove the planetary carrier 104, planet gears 114 and the cap 122,422 from the sun gear 82,382, ring gear 58,358 and shaft 30. In the FIG. 2 embodiment, the snap ring 86 and sun gear 82 are then removed from the end of the shaft 30 and the bolts 96 are removed from the reaction plate 94 so that the reaction plate 94 can be removed to permit access to the disc brake pack 150. The brake discs 152,154 can then be replaced or serviced without disturbing the mounting of the wheel 18 on the wheel hub 74. After the disc brake pack 150 has been serviced, the reverse steps are taken to reassemble the planetary gear train to the wheel hub 74 and the arrangement is again ready for operation.

In the FIG. 3 version, after the bolts 106 that retain the planetary carrier 104 to the wheel hub 374 have been removed, the planetary carrier 104, planet gears 114 and cap 422 are removed from the sun gear 382 and ring gear 358. The snap ring 360 is then removed from the reaction plate 394 whereupon access to the disc brake pack 450 is obtained. After servicing the disc brake pack 450, reaction plate 394, snap ring 360, and planetary carrier 104 are replaced and bolted to the wheel hub 374 by bolts 106 whereupon the unit is, once again, ready for use, all without removing the wheel 18 from the hub 374.

In the FIG. 2 embodiment, a large number of brake discs 152,154 are employed because the torque due to frictional forces existing at the interface of the brake discs is proportional to the applied pressure, to the coefficient of friction between the discs, to the contact area, and to the means radius of the friction discs. Because of the small size of the FIG. 2 design discs, a larger number of discs than those of the FIG. 3 design are required, assuming that the same pressure and coefficient of friction exist. In the FIG. 3 version, the brake discs are larger in diameter and have overall increased braking surface so that fewer brake discs 452,454 are required to affect the same braking torque.

We claim:

1. In a wheel drive assembly for a vehicle having a rotatably driven shaft, a sun gear affixed to said shaft, a spindle carried by the vehicle and encircling a portion of said shaft, a ring gear fixed on said spindle, a wheel, a hub on said wheel rotatably mounted relative to said spindle, a planetary carrier fixed to said hub, a plurality of planet gears carried on said planetary carrier and engaging between said rotating sun gear and said fixed ring gear for rotating said wheel relative to said vehicle, a piston seated in said spindle and having a sleeve encircling said shaft, said piston and sleeve being axially movable relative to said spindle, a spring extending between said spindle and said sleeve for holding said piston retracted in said spindle, brake disc means carried by said spindle in alignment with said piston, brake disc means carried by said shaft for rotation with said shaft, said last-named brake disc means interfitting with said first-named brake disc means, means for activating said piston to compress said spring and to lock said first and second-named brake disc means together whereby the rotation of the second-named brake disc means, the shaft and the wheel will be stopped.

2. In a wheel drive assembly as claimed in claim 1 wherein said first-named brake disc means is splined to said non-rotating spindle for axial movement, and said second-named brake disc means is splined to said rotating shaft for axial movement.

3. In a wheel drive assembly as claimed in claim 2 wherein a reaction plate is mounted on said spindle in alignment with said piston and with said first and second brake disc means.

4. In a wheel drive assembly as claimed in claim 1 wherein said piston encircles said shaft and is seated in a cavity in said spindle, and said spring encircles said sleeve and returns the piston to the retracted position to release the first and second brake disc means from engagement with each other.

5. In a wheel drive assembly as claimed in claim 1 wherein cooling fluid encircles a portion of said sun gear, said sun gear and said planet gears having meshing teeth, a passageway communicates from a root of the teeth of said sun gear to the first and second brake disc means, said teeth of the planet gears meshing with the teeth of the sun gear to force cooling fluid from between the planet gears and the sun gear through the passageway onto the first and second brake disc means to cool same.

6. In a wheel drive assembly having a rotatably driven shaft mounted on a vehicle, a sun gear affixed to said shaft, a spindle carried by the vehicle and encircling a portion of said shaft, a ring gear fixed on said spindle, a wheel, a hub on said wheel rotatably mounted relative to said spindle and having an axially open end, a planetary carrier removably fixed to said hub around said open end, a plurality of planet gears carried on said planetary carrier, said planet gears as carried by said planetary carrier passing through said open end of said hub and engaging between said sun gear and said ring gear for rotating said wheel relative to said vehicle, said planetary carrier and planet gears being removable from said hub without removing said wheel and hub from said spindle, a piston encircling said shaft and seated in a cavity in said spindle, a plurality of non-rotatable brake discs splined in said spindle and in alignment with each other and in alignment with said piston, a mating plurality of rotating brake discs splined on said shaft for rotation with said shaft, with each rotating disc being interleafed between each pair of said non-rotating discs, a reaction plate on the opposite end of said plurality of non-rotating and rotating brake discs, and means for pressurizing the cavity behind said piston to drive the non-rotating brake discs into locking relationship with said rotating brake discs against said reaction plate whereby the rotation of the shaft and wheel is stopped, said brake discs being accessible when said planetary carrier and planet gears are removed from said hub.

7. In a wheel drive assembly for a vehicle having a rotatably driven shaft, a sun gear affixed to said shaft, a non-rotatable spindle mounted on the vehicle and encircling a portion of said shaft, a ring gear fixed on said spindle, a wheel, a hub on said wheel rotatably mounted relative to said spindle, a planetary carrier fixed to said hub, a plurality of planet gears carried on said planetary carrier and engaging between said sun gear and said ring gear, non-rotatable brake means splined to said spindle, rotatable brake means splined to said shaft for rotation with said shaft, and a piston for moving the non-rotating brake means into locking relationship with said rotating brake means whereby the rotation of the shaft and wheel will be stopped, said piston encircles said shaft and is seated in a cavity in said spindle, spring means acting on said piston to return the piston to a position to release the first and second brake disc means from engagement with each other.

8. In a wheel drive assembly as claimed in claim 7 wherein cooling fluid encircles a portion of said sun gear, said sun gear and said planet gears having intermeshing teeth, a passageway communicating from a root of the teeth of said sun gear to the first and second brake disc means, said teeth on the planet gears meshing with the teeth on the sun gear to force cooling fluid from between the planet gears and the sun gear through the passageway onto the first and second brake disc means to cool same.

9. In a wheel drive assembly as claimed in claim 8 wherein a cap means is provided on the end of said shaft, said cap means has collar means encircling the ends of said meshing teeth of the planet gears and the teeth of said sun gear for providing a close tolerance so that the meshing teeth of the planet gears and the teeth of the sun gear will act as a gear pump to pump the cooling fluid to the brake disc means.

10. In a wheel drive assembly for a vehicle having a rotatably driven shaft, a sun gear affixed to said shaft, a non-rotatable spindle mounted on the vehicle and encircling a portion of said shaft, a ring gear fixed on said spindle, a wheel, a hub on said wheel rotatably mounted relative to said spindle, said hub having an axially open end, a planetary carrier removably fixed to the open end of said hub, a plurality of planet gears carried on said planetary carrier and engaging between said sun gear and said ring gear, said planetary carrier and said plurality of planet gears being removable from said hub without removing said wheel and hub from said spindle, non-rotatable brake means splined to said spindle, rotatable brake means splined to said shaft for rotation with said shaft, and means for moving the non-rotating brake means into locking relationship with said rotating brake means whereby the rotation of the shaft and wheel will be stopped, said brake discs being accessible through the open end of the hub when said planetary carrier and planet gears are removed from said hub.

11. In a wheel drive assembly as claimed in claim 10 wherein said non-rotatable brake means are a plurality of brake discs splined for axial movement relative to said spindle, and said rotatable brake means are a plurality of brake discs splined for axial movement relative to said shaft, said rotatable brake discs being rotated by said shaft and being interleafed between said non-rotatable brake discs.

12. In a wheel drive assembly as claimed in claim 11 wherein a non-rotatable reaction plate is carried by said spindle in alignment with said non-rotatable and rotatable brake discs and in alignment with said means for moving said brake discs into locking relationship whereby said last-named means drives said brake discs against said reaction plate for stopping the rotation of said shaft.

13. In a wheel drive assembly as claimed in claim 11 wherein said means for moving the non-rotating brake means into locking relationship with the rotating brake means is a piston carried by said spindle in alignment with said non-rotating and said rotating brake means.

14. In a wheel drive assembly as claimed in claim 10 wherein cooling fluid encircles a portion of said sun gear, said sun gear and said planet gears having meshing teeth, a passageway communicates from a root of the teeth of said sun gear to the first and second brake disc means, said teeth of the planet gears meshing with the teeth of the sun gear to force cooling fluid from between the planet gears and the sun gear through the passageway onto the first and second brake disc means to cool same.

* * * * *